US010312506B2

(12) United States Patent
Tran et al.

(10) Patent No.: US 10,312,506 B2
(45) Date of Patent: Jun. 4, 2019

(54) PROCESS FOR THE PREPARATION OF CARBON-COATED LITHIUM TRANSITION METAL PHOSPHATE AND ITS USE

(71) Applicant: JOHNSON MATTHEY PUBLIC LIMITED COMPANY, London (GB)

(72) Inventors: Nicolas Tran, Moosburg (DE); Genovefa Wendrich, Bavaria (DE)

(73) Assignee: Johnson Matthey Public Limited Company, London, England (GB)

( * ) Notice: Subject to any disclaimer, the term of this patent is extended or adjusted under 35 U.S.C. 154(b) by 5 days.

(21) Appl. No.: 15/308,166

(22) PCT Filed: May 6, 2015

(86) PCT No.: PCT/GB2015/051317
§ 371 (c)(1),
(2) Date: Nov. 1, 2016

(87) PCT Pub. No.: WO2015/170084
PCT Pub. Date: Nov. 12, 2015

(65) Prior Publication Data
US 2017/0069908 A1   Mar. 9, 2017

(30) Foreign Application Priority Data
May 7, 2014   (EP) .................................. 14001612

(51) Int. Cl.
*H01M 4/1393*   (2010.01)
*H01M 4/136*   (2010.01)
(Continued)

(52) U.S. Cl.
CPC ........... *H01M 4/1393* (2013.01); *C01B 25/37* (2013.01); *C01B 25/372* (2013.01);
(Continued)

(58) Field of Classification Search
None
See application file for complete search history.

(56) References Cited

U.S. PATENT DOCUMENTS

| 5,910,382 A | 6/1999 | Goodenough et al. |
| 6,514,640 B1 | 2/2003 | Armand et al. |

(Continued)

FOREIGN PATENT DOCUMENTS

| CN | 101420034 A | 4/2009 |
| CN | 101826617 A | 9/2010 |

(Continued)

OTHER PUBLICATIONS

Database CA [online], Chemical Abstracts Service, Columbus, Ohio, US; Dec. 29, 2011 (Dec. 29, 2011), He, Kainian et al: "Solid-phase synthesis process for lithium ion battery positive electrode material lithium ferrous phosphate by using phosphoric acid", XP002728783, retrieved from STN Database accession No. 156:38373.

(Continued)

*Primary Examiner* — Yoshitoshi Takeuchi
(74) *Attorney, Agent, or Firm* — BakerHostetler

(57) ABSTRACT

A process for the preparation of carbon-coated lithium transition metal phosphate having the formula $Li_{0.9+x}M_yMn_{1-y}PO_4$ and its use as cathode material in secondary lithium-ion batteries wherein the process includes few synthesis steps which can be conducted easily, therefore providing a low cost process and results in a complete reaction of the starting material compounds or the mixtures thereof. At least one starting material compound is dispersed or dissolved in an essentially aqueous medium and heated to a temperature between 50° C. and 100° C. prior to addition of the remaining starting material compounds.

15 Claims, 1 Drawing Sheet

(51) Int. Cl.

| | | |
|---|---|---|
| C01B 25/37 | (2006.01) | |
| C01B 25/45 | (2006.01) | |
| H01M 4/36 | (2006.01) | |
| H01M 4/58 | (2010.01) | |
| H01M 4/62 | (2006.01) | |
| H01M 4/04 | (2006.01) | |
| H01M 4/133 | (2010.01) | |
| H01M 4/1397 | (2010.01) | |
| H01M 4/587 | (2010.01) | |
| H01M 10/0525 | (2010.01) | |
| H01M 4/02 | (2006.01) | |

(52) U.S. Cl.
CPC .......... *C01B 25/375* (2013.01); *C01B 25/377* (2013.01); *C01B 25/45* (2013.01); *H01M 4/04* (2013.01); *H01M 4/133* (2013.01); *H01M 4/136* (2013.01); *H01M 4/1397* (2013.01); *H01M 4/366* (2013.01); *H01M 4/587* (2013.01); *H01M 4/5825* (2013.01); *H01M 4/625* (2013.01); *H01M 10/0525* (2013.01); *C01P 2006/40* (2013.01); *H01M 2004/028* (2013.01)

(56) References Cited

U.S. PATENT DOCUMENTS

| | | |
|---|---|---|
| 2002/0106563 A1 | 8/2002 | Okawa et al. |
| 2004/0005265 A1 | 1/2004 | Chiang et al. |
| 2006/0194112 A1 | 8/2006 | Barker et al. |
| 2009/0246636 A1 | 10/2009 | Chiang et al. |
| 2011/0012067 A1 | 1/2011 | Kay |
| 2011/0017947 A1 | 1/2011 | Nuspl et al. |
| 2011/0052988 A1 | 3/2011 | Beck et al. |
| 2011/0165462 A1 | 7/2011 | Zhamu et al. |
| 2012/0003540 A1 | 1/2012 | Nakano et al. |
| 2014/0099548 A1* | 4/2014 | Kim ............... H01M 4/364 429/220 |

FOREIGN PATENT DOCUMENTS

| | | |
|---|---|---|
| CN | 102259844 A | 11/2011 |
| CN | 102356488 A | 2/2012 |
| CN | 102496711 A | 6/2012 |
| CN | 103359701 A | 10/2013 |
| EP | 2 458 666 A1 | 5/2012 |
| EP | 1 682 446 B1 | 8/2012 |
| WO | 2005/062404 A1 | 7/2005 |
| WO | 2013/016426 A1 | 1/2013 |
| WO | WO 2014206337 A1 | 12/2014 |

OTHER PUBLICATIONS

Database WPI, Week 201074, 2010, Thomson Scientific, London, GB; AN 2010-M45882, XP002728784.

International Search Report, dated Aug. 6, 2015, from corresponding PCT Application.

European Search Report, dated Sep. 4, 2014, from corresponding European Application.

* cited by examiner

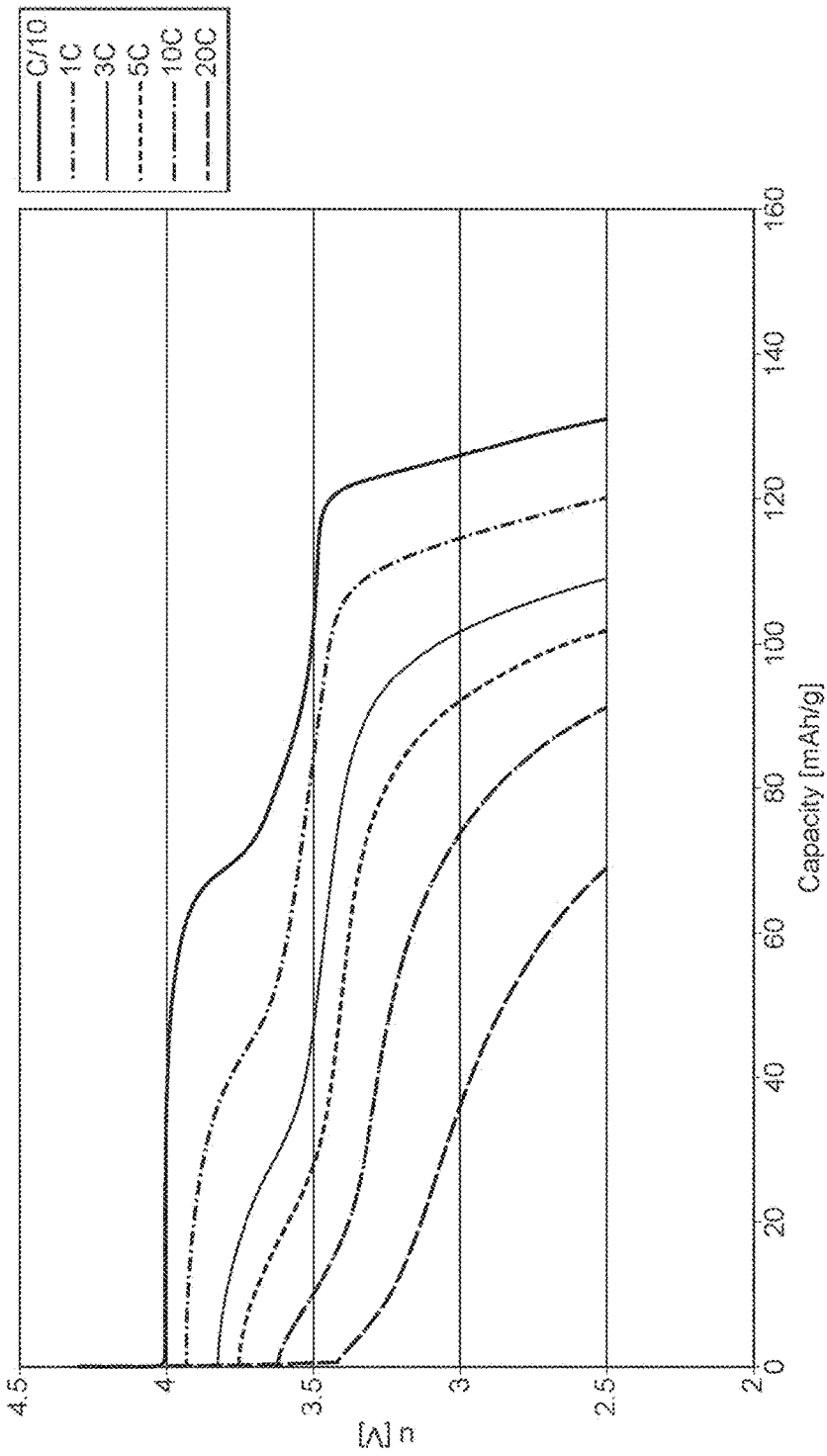

PROCESS FOR THE PREPARATION OF CARBON-COATED LITHIUM TRANSITION METAL PHOSPHATE AND ITS USE

FIELD OF THE INVENTION

The present invention relates to a process for the preparation of carbon-coated lithium transition metal phosphate comprising carbon and the use thereof as cathode material in secondary lithium-ion batteries.

BACKGROUND OF THE INVENTION

Lithium metal phosphates with olivine structure have emerged as promising cathode materials in secondary lithium-ion batteries. The advantages of the lithium metal phosphates, compared with other lithium compounds based on spinels or layered oxides, are their environmental benignity and their safety properties during battery handling and operation.

The poor electrochemical performance of pure lithium iron phosphate was improved by coating the particles with carbon.

The disadvantage of lithium iron phosphate is in the lower $Fe^{3+}/Fe^{2+}$ redox couple having a flat potential curve at 3.4 V vs. $Li/Li^+$ as opposed to conventional oxide chemistries having an average potential of 3.7 V vs. $Li/Li^+$. In order to improve the electrochemical properties of the lithium metal phosphate in terms of average voltage, it is tempting to substitute fully the iron by manganese in the lithium iron phosphate crystal structure because the $Mn^{3+}/Mn^{2+}$ redox couple causes a flat potential curve at 4.1 V vs. $Li/Li^+$. However, in most of the practical cases, the full capacity at 4.1 V is not achieved for pure lithium manganese phosphate without iron coexistence.

Melting processes, hydrothermal processes and solid-state processes are the most common synthesis routes for the preparation of lithium metal phosphates.

WO 2005062404 A1 discloses a melting process for the preparation of lithium metal phosphate by melting the starting materials comprising a metal compound, a lithium compound and a phosphate compound at a temperature of about 1000° C. under non-reactive or partially reducing atmosphere.

EP 1682446 B1 discloses the preparation of lithium metal phosphate through the reaction of a Li-source, at least one M-source (M can be Fe, Mn, Co, Ni) and at least one $PO_4$-source under hydrothermal conditions at a temperature between 100° and 250° C. and at a pressure from 1 to 40 bar. The addition of an electrically conducting material before heat treating is also described.

U.S. Pat. No. 5,910,382 C1 and U.S. Pat. No. 6,514,640 C1 disclose a solid state synthesis route for the preparation of $LiMPO_4$. The starting materials containing a Li-source, a M-source (M can be Fe, Mn, Co, Ni) and a $PO_4$-source are mixed, calcined between 300° C. and 350° C. and then heated to about 800° C. in argon.

EP 2458666 A1 describes a nano particulate $LiMPO_4$ as cathode material where M is selected from at least one metal of the group of Mn, Fe, Co and Ni. The nano particulate $LiMPO_4$ is obtained from $LiMPO_4$ prepared by well known methods, e.g. a solid state synthesis route, or from precursor materials of $LiMPO_4$. The disclosed process comprises mixing $LiMPO_4$ or the precursor materials thereof with a carbon precursor at ambient temperature, adding a stabilizing agent, wet milling the mixture, drying and calcining the obtained mixture.

SUMMARY OF THE INVENTION

The disadvantages of the processes of the prior art include the obtaining of non-stoichiometric materials, the incompleteness of the reaction and the remaining of impurities in the obtained materials.

Therefore it is the object of the present invention to provide an alternative process for manufacturing carbon-coated lithium transition metal phosphates which show similar if not better electrochemical performance than materials of the prior art when the carbon-coated lithium transition metal phosphate according to the present invention is used as active electrode material in secondary batteries. Furthermore, it is the object of the present invention to provide a process for the preparation of carbon-coated lithium transition metal phosphate comprising only a few synthesis steps which can be conducted easily, e.g. because no waste water is formed during the process. Moreover, the costs of the raw materials are lower and only 1 mole of lithium per mole of metal is used, therefore a low cost process is provided.

The object is achieved by a process for the preparation of a carbon-coated lithium transition metal phosphate, wherein the lithium transition metal phosphate has the formula

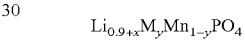

$$Li_{0.9+x}M_yMn_{1-y}PO_4$$

wherein
M is at least one element of the group of Fe, Co, Ni, Mg, Zn, Ti, Ca, Sr, Ba, Al, Zr
$0 \leq x \leq 0.2$
$0 \leq y \leq 1.0$ said process comprising the steps:

a) dispersing or dissolving at least one starting material compound selected from the group consisting of at least one lithium source, at least one M source, if present, at least one manganese source, if present, and at least one phosphorous source, in an essentially aqueous medium to obtain a starting material dispersion or solution and heating the starting material dispersion or solution;

b) adding remaining starting material compounds selected from the group consisting of at least one lithium source, at least one M source, if present, at least one manganese source, if present, and at least one phosphorus source, said remaining starting material compounds not being present in the starting material dispersion or solution obtained in step a), to the starting material dispersion or solution obtained in step a) to provide a precursor mixture;

c) subjecting the precursor mixture obtained in step b) to at least one wet milling step in the presence of at least one electrically conducting material or at least one precursor of an electrically conducting material to obtain a wet milled suspension;

d) drying the wet milled suspension obtained in step c) to obtain a solid compound; and e) heat treating the solid compound obtained in step d).

The invention further provides a carbon-coated lithium transition metal phosphate obtained by the process of the invention.

The invention further provides the use of a carbon-coated lithium transition metal phosphate prepared by the process of the invention for the preparation of a cathode of a secondary lithium-ion battery.

The invention further provides a secondary lithium-ion battery comprising an anode, a cathode and an electrolyte, wherein the cathode comprises carbon-coated lithium transition metal phosphate manufactured by the process according to the present invention.

BRIEF DESCRIPTION OF THE DRAWINGS

FIG. 1: Rate capabilities of a cathode containing lithium iron manganese phosphate according to the present invention

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides a process for the preparation of carbon-coated $Li_{0.9+x}FePO_4$ (i.e. y=1).

The invention further provides a process for the preparation of carbon-coated $Li_{0.9+x}MnPO_4$ (i.e. y=0).

The invention further provides a process for the preparation of carbon-coated $Li_{0.9+x}Fe_{0.5}Mn_{0.5}PO_4$ (i.e. y=0.5).

The invention further provides a process for the preparation of carbon-coated $Li_{0.9+x}Fe_{0.34}Mn_{0.66}PO_4$ (i.e. y=0.34).

It was surprisingly found that the heating of at least one starting material compound prior to addition of the remaining starting material compounds provides an improved process, such as completeness of the reaction.

Further, the process conditions according to the present invention result in a complete reaction of the starting materials or of the mixtures thereof and may avoid the formation of phase impurities in the obtained product.

Step a)

In step a) of the process according to the present invention at least one starting material compound is dispersed or dissolved in an essentially aqueous medium and heated. The at least one starting material is selected from the group consisting of at least one lithium source; at least one M source (if present); at least one manganese source (if present); and at least one phosphorous source.

The at least one lithium source is preferably chosen from the group consisting of $Li_2CO_3$, LiOH, $LiOH.H_2O$, $Li_2O$, LiCl, $LiH_2PO_4$ and/or $Li_3PO_4$ or mixtures thereof.

If M (M being selected from Fe, Co, Ni, Mg, Zn, Ti, Ca, Sr, Ba, Al, Zr) is present, the at least one M source is preferably chosen from metal chlorides, metal hydroxides, metal organyl salts, metal carboxylates such as metal oxalates, metal citrates, metal acetates and metal carbonates or mixtures thereof. In one preferred embodiment of the present invention the M source contains Fe in the oxidation state +2.

If manganese is present, the at least one manganese source is preferably chosen from $MnCO_3$, $MnO_2$, and $MnC_2O_4.2H_2O$ or mixtures thereof containing manganese in the oxidation state +2, +3 or +4. In one preferred embodiment of the present invention the manganese source contains $MnCO_3$.

The at least one phosphorous source is chosen from $H_3PO_4$, metal phosphate, metal hydrogen phosphate, metal dihydrogen phosphate or mixtures thereof.

The at least one starting material compound is dispersed or dissolved in an essentially aqueous medium to obtain a starting material dispersion or solution. By an "essentially aqueous medium" is meant a medium which comprises more than 50% water, such as more than 60%, more than 75%, more than 90%. The non-aqueous component may be any component compatible with the water, such as dimethylsulphoxide (DMSO) or an alcohol, such as ethanol.

Suitably, the starting material compound comprises at least one manganese source or at least one M source.

Alternatively, the starting material compound comprises at least one lithium source or at least one phosphorus source.

Alternatively, two or more starting material compounds are provided as a mixture and dispersed or dissolved in an essentially aqueous medium. For examples, a mixture of the at least one lithium source and the at least one phosphate source are dispersed or dissolved in an essentially aqueous medium. Alternatively, any two or more other starting material compounds are mixed and dispersed or dissolved in an essentially aqueous medium.

In a first embodiment the starting material dispersion or solution is heated to a temperature between 50° C. and 100° C., preferably to a temperature between 80° C. and 100° C.

Step b)

In step b), the starting material compounds selected from the group consisting of at least one lithium source, at least one M source, if present, a manganese source, if present, and a phosphorus source which have not been used in step a) and are not contained in the starting material dispersion or solution (the "remaining starting material compounds"), are added to the starting material dispersion or solution obtained in step a) to provide a precursor mixture.

The remaining starting material compounds may also be dispersed or dissolved in an essentially aqueous medium and optionally heated (in a similar manner to step a)) prior to being added to the starting material dispersion or solution obtained in step a).

If the dispersion or solution comprising the remaining starting material compounds is not heated prior to being added to the starting material dispersion or solution obtained in step a), the addition to be carried out in a controlled manner such that the temperature of the combined dispersion or solution remains between 50° C. and 100° C., suitably between 80° C. and 100° C.

For example, the Mn-source or the M source (e.g. Fe) is dispersed or dissolved in an essentially aqueous medium, and heated (e.g. to a temperature between 50° C. and 100° C., preferably between 80° C. and 100° C.) to give the starting material dispersion or solution (step a)); a mixture of the Li-source and phosphorus source is dispersed or dissolved in an essentially aqueous medium and optionally heated (e.g. to a temperature between 50° C. and 100° C., preferably between 80° C. and 100° C.) and added to the starting material dispersion or solution obtained from step a) to provide a precursor mixture.

The addition in step b) of the one or more remaining starting material compounds to the starting material dispersion or solution obtained from step a) to obtain the precursor mixture can be performed discontinuously (i.e. in a portion-wise manner) or continuously (i.e. as a constant stream).

In one embodiment, all the remaining starting material compounds are added to the starting material dispersion at the same time (i.e. concurrently).

In an alternative embodiment, one or more (but not all) of the remaining starting material compounds are added to the starting material dispersion; once addition of these remaining starting material compounds is complete, then any other remaining starting material compounds are added (i.e. there is sequential addition of at least two remaining starting materials).

During the addition in step b), a gas evolution is observed; essentially the evolved gas is carbon dioxide due to the reaction of a gas generating source material being in the starting material compounds with the acidic environment. Typically, metal carbonates react with phosphorous acid resulting in a gas generation. The term "gas generating source materials" or "source materials reacting under gas generation" means any source material which is able to generate gas during the process steps according to the present invention. Suitable gas generating source materials include, but not limited to, carbonate, oxalate and carboxylate. The intensity of the evolution of gas essentially depends on the chosen starting material compounds, the order of addition of the starting material compounds or the mixtures thereof, the speed of addition and the temperature during the addition.

The evolution of gas is typically accompanied by foaming. It is therefore preferred to complete the evolution of gas in the precursor mixture before the further steps of the process according to the present invention are performed. It is a preferred embodiment of the present invention that the gas evolution is finished before the wet milling step (step c)) according to the present invention is conducted. In cases where the gas evolution has not been finished the gas formation may be again initiated during the wet milling step, the drying step or the heat treatment. The later gas formation yields an obtained product containing agglomerates with undesirable properties, such as irregular density, irregular porosity and/or surface defects.

The order of the addition of the starting material compounds or the mixtures thereof has a strong influence on the evolution of gas. It is observed that the addition of phosphoric acid or the addition of the mixture of phosphoric acid and the Fe-source into the Mn-containing slurry results in a strong evolution of gas whereas the reversed order of addition, the addition of the Mn-source into the phosphoric acid generates mild evolution of gas. The addition of the mixture of the Li-source and phosphoric acid resulting in a solution of $LiH_2PO_4$ into the Mn-containing slurry or in the mixture containing the Mn-source and the Fe-source shows a very mild evolution of gassing. However, the order of addition is not a key feature of the invention, and gas evolution can be re-started/improved by heating to a temperature of between 50° C. to 100° C., suitably 80° C. to 100° C. to ensure completion of the gas evolution.

Furthermore, the addition speed of the starting material compounds or the mixtures thereof influences the gas formation. The addition of the remaining starting materials to the starting material dispersion of solution suitably is carried out over a time period of between 1 and 3 hours, suitably followed by at least a further hour of mixing to ensure complete reaction of the starting material compounds and completion of the gas evolution.

Step c)

According to the present invention the precursor mixture obtained as a result of step b) is subjected to a wet milling step in order to decrease the primary particle size of the particles in the precursor mixture and to destroy any agglomerates formed from the primary particles. It is preferred that the $D_{50}$-value of the primary particles is not greater than 200 nm. In one embodiment of the present invention the preferred $D_{50}$-value is not greater than 100 nm, the most preferred $D_{50}$-value is not greater than 50 nm. The $D_{50}$-values here give the values at which 50 volume-% of the particles in the measured sample have smaller or the same particle diameter.

The wet milling process is essentially performed in aqueous medium and in the presence of at least one electrically conducting material or at least one precursor of an electrically conducting material.

The at least one electrically conducting material or at least one precursor of an electrically conducting material is suitably a carbon source. The carbon source is selected from elemental carbon or carbon precursor.

As elemental carbon graphite, carbon black, Ketjen Black, acetylene black, carbon nanotubes, vapor grown carbon fibers (VGCF) etc. may be used. The elemental carbon source is added at 2-5 wt %, suitably 2-3 wt % relative to the weight of the carbon-coated lithium transition metal phosphate.

Carbon precursors are typically carbon-containing compounds which decompose to a carbonaceous residue when exposed to heat treatment. Representative but non-limiting examples of such a carbon containing compound are: e.g. starch, maltodextrin, gelatine, polyol, sugar (such as mannose, fructose, sucrose, lactose, glucose, galactose), a partially water-soluble polymer such as a polyacrylate, and mixtures thereof. Carbon precursors are added at between 7-15 wt %, suitably around 10 wt % relative to the weight of the carbon-coated carbon-coated lithium transition metal phosphate product. Ideally, 2-3 wt % of carbon is present in the final product and since the carbon precursors decompose to provide the carbon, a higher weight or the precursor is required to give the 2-3 wt % in the final product.

Optionally, at least one liquefying agent may be added to control the viscosity of the precursor slurry during the wet milling. The liquefying agent is water-soluble and should also be carbonisable under heat treatment in inert atmosphere. Suitable liquefying agents comprise but are not limited to: citric acid, tartaric acid maleic acid, oxalic acid, glycolic acid, 1,2,3,4 butanetetracarboxylic acid, amino propanol or mixtures thereof. It is preferred to use a combination of adequate liquefying agents, e.g. citric acid and amino propanol. The amount of the liquefying agents depends on the viscosity of the precursor mixture. If the viscosity is high, a liquefying agent may need to be added in order to prevent the clogging of the wet mill. It is observed that the more the gassing reaction is completed before the wet milling, the less the liquefying agents are needed during the wet milling. The amount of the liquefying agent or the mixtures thereof is usually between 0.5 and 9.5 weight-% based on the weight of grinding material.

In a further embodiment of the present invention further liquefying agents can be added discontinuously or continuously during the wet milling step c).

The milling device is selected from ball mills well known to a person of ordinary skill in the art. For the conduction of the wet milling step according to the present invention a ball mill is preferred with beads having a diameter between 100 and 300 µm. The grinding beads are suitably made of $ZrO_2$. The milling compartment and the milling unit are covered by a protective layer to avoid contamination of the grinding materials by abrasion and/or chemical reaction. Preferably, the protective layer is made of or comprises polyurethane or a ceramic layer like zirconia, silicon nitride or silicon carbide. The milling energy introduced into the precursor slurry is preferably set between 2000 kWh/t and 3200 kWh/t while the reference mass (t) refers to the mass of the solids in the precursor slurry. The introduced energy generates heat so that the precursor slurry has to be cooled by a suitable cooling device.

In an optional embodiment of the present invention a reducing agent is added in order to reduce the oxidation state of the metal M in the metal starting compound, if necessary. For example when M is Mn it is preferred to lower the content of $Mn^{3+}$-ions or $Mn^{4+}$-ions in the Mn-source. The presence of Mn in the oxidation state other than +2 deteriorates the electrochemical performance of the active cathode material manufactured by the process of the present invention. Suitable reducing agents are ascorbic acid, oxalic acid, formic acid, thiols, and polyphenols.

The addition of the reducing agent may also be carried out in step a), b) or c) of the present invention.

Step d)

After the wet milling step c) drying of the obtained wet milled suspension d) is carried out.

The drying step d) according to the present invention can be performed by all methods known to a person having ordinary skills in the art and which are suitable for the removal of water and solvent respectively. The preferred drying methods according to the present invention are drying in the vacuum oven or spray-drying. It can be carried out by any commercially available devices, e.g. a conventional co-current spray-dryer. The spray-drying is carried out at an inlet drying gas at temperature between 120° C. and 500° C.

Step e)

The dried solid compound obtained in step d) is subjected to a heat treatment.

The heat treatment step e) according to the present invention is carried out under protective gas, preferably under nitrogen, but all other known protective gases as well as mixtures thereof can also be used. The process can be performed discontinuously or continuously. Any devices are suitable for the heat treatment known to a person having ordinary skills in the art. The preferred embodiment according to the invention is a continuously operated rotary kiln. The heat treatment is a pyrolysis carried out at temperature between 500° C. and 850° C. typically over a period of about 1 h.

The present invention also relates to a carbon-coated lithium transition metal phosphate obtained by a process according to the present invention.

The present invention also relates to the use of carbon-coated lithium transition metal phosphate prepared by the process according to the present invention for the preparation of a cathode of a secondary lithium-ion battery as an electrochemically active material. The cathode usually contains the active material, a conducting agent and a binder. Typically the content of the binder is between 1 and 10 weight %, preferably between 1 and 3 weight %.

The present invention also relates to secondary lithium-ion battery comprising an anode, a cathode and an electrolyte, wherein the cathode comprises a carbon-coated lithium transition metal phosphate prepared by the process according to the present invention.

The invention will now be further described with reference to the following examples which are intended to be illustrative, and not limiting, of the invention.

Example 1

Preparation of $LiMn_{0.66}Fe_{0.34}PO_4$

In a first beaker 197.60 g $MnCO_3$ (technical grade, Honeywell) were dispersed in 265 g distilled water. The obtained suspension was heated up to a temperature of between 80° C. and 100° C. and homogenized for 30 minutes. In a second beaker 109.82 g $LiOH.H_2O$ (SQM Solar S.A.) were dispersed in 400 g distilled water and homogenized. 293.42 g $H_3PO_4$ (85%, analytical grade, Merck) were added to the obtained dispersion in the second beaker, which resulted in an exothermal reaction and a clear solution. The content of the second beaker (having a temperature <30° C.) was introduced into the first beaker (having a temperature between 80° C. and 100° C.), over a time period of one hour. The resulting suspension was heated up to a temperature between 80° C. and 100° C. and kept in that temperature range for 60 minutes during which the viscosity increases. The gas formation began when the obtained suspension reached the temperature of about 80° C. After addition of 155.66 g $FeC_2O_4.2H_2O$ (technical grade, Dr. Paul Lohmann) to that suspension the viscosity decreased. The obtained slurry was further heated to a temperature between 80° C. and 100° C. for 60 minutes, after which no further gas evolution was observed. 39.60 g lactose (EGESIE GmbH) were added. The slurry was subjected to milling in a wet mill of the type Dispermat SL 100 and to drying in a vacuum oven at a temperature in the range between 100° C. and 120° C. overnight and then calcined at about 700° C. under $N_2$ for 1 hour (heating up to 700° C. during 3 hours, keeping the temperature for 1 hour).

Example 2

Preparation of $LiMnPO_4$

In a first beaker 308.14 g $MnCO_3$ (technical grade, Honeywell) were dispersed in 615.73 g distilled water. The obtained suspension was heated up to a temperature between 80° C. and 100° C. In a second beaker 109.82 g $LiOH.H_2O$ (SQM Solar S.A.) were dispersed in 300 g distilled water, heated up to about 40° C. and homogenized. 301.72 g $H_3PO_4$ (85%, analytical grade, Merck) were added to the obtained dispersion in the second beaker, which resulted in an exothermal reaction. The content of the second beaker was poured into the first beaker (having a temperature between 80° C. and 100° C.), over a time period of one hour. The resulting suspension was heated to a temperature between 80° C. and 100° C. and maintained at that temperature range for 4 hours. The gas formation began when the obtained suspension reached a temperature of about 80° C. After no more gas evolution was observed, 39.60 g lactose (EGESIE GmbH) were added to the slurry which was then subjected to milling in a wet mill of the type Dispermat SL 100 and to drying in a vacuum oven at a temperature in the range between 100° C. and 120° C. overnight and then calcined at about 700° C. under $N_2$ for 1 hour (heating up to 700° C. during 3 hours, keeping the temperature for 1 hour).

Example 3

Preparation of $LiFePO_4$

In a first beaker 765.06 g distilled water was heated to a temperature between 80° C. and 100° C. 470.80 g $FeC_2O_4.2H_2O$ (technical grade, Dr. Paul Lohmann) were dispersed in the heated distilled water, maintaining the temperature between 80° C. and 100° C. during the addition of $FeC_2O_4.2H_2O$. In a second beaker 109.82 g $LiOH.H_2O$ (SQM Solar S.A.) were dispersed in 300 g distilled water, heated up to about 40° C. and homogenised. 301.72 g $H_3PO_4$ (85%, analytical grade, Merck) were added to the homogenised dispersion which resulted in an exothermal reaction. The content of the second beaker was poured into the first beaker (having a temperature between 80° C. and 100° C.) over a time period of one hour. The resulting suspension was heated to a temperature between 80° C. and 100° C. and maintained at that temperature range for 4 hours. The gas formation began when the obtained suspension reached a temperature of about 80° C. After no more gas evolution was observed, 39.60 g lactose (EGESIE GmbH) were added. The slurry was subjected to milling in a wet mill of the type Dispermat SL 100 and to drying in a vacuum oven at a temperature in the range between 100° C. and 120° C. overnight and then calcined at about 700° C. under $N_2$ for 1 hour (heating up to 700° C. during 3 hours, keeping the temperature for 1 hour).

Example 4

Preparation of $LiMn_{0.66}Fe_{0.34}PO_4$

In a first beaker 197.60 g $MnCO_3$ (technical grade, Honeywell) and 2.7 g L ascorbic acid (Sigma Aldrich) were dispersed in 265 g distilled water. The obtained suspension was heated up to a temperature between 80° C. and 100° C. and homogenized for 30 minutes. In a second beaker 109.82 g $LiOH.H_2O$ (SQM Solar S.A.) were dispersed in 400 g distilled water and homogenized. 293.42 g $H_3PO_4$ (85%, analytical grade, Merck) were added which resulted in an exothermal reaction and in a clear solution. The content of the second beaker having a temperature <30° C. was introduced into the first beaker (having a temperature between 80° C. and 100° C.) over a time period of one hour. The resulting suspension was heated to a temperature between 80° C. and 100° C. and kept in that temperature range for 60 minutes during which the viscosity increases. The gas formation began when the obtained suspension reached a temperature of about 80° C. After addition of 155.66 g $FeC_2O_4.2H_2O$ (technical grade, Dr. Paul Lohmann) to that suspension the viscosity decreased. The obtained slurry was further heated to a temperature between 80° C. and 100° C. for 60 minutes, after which no more gas evolution was observed. 39.60 g lactose (EGESIE GmbH) were added. The slurry was subjected to milling in a wet mill of the type Dispermat SL 100 and to drying in a vacuum oven at a temperature in the range between 100° C. and 120° C. overnight and then calcined at about 700° C. under N2 for 1 hour (heating up to 700° C. during 3 hours, keeping the temperature for 1 hour).

Electrochemical Performance

Thin film electrodes as disclosed for example in Anderson et al., Electrochemical and Solid State Letters, 3, (2), 2000, p. 66-68 were produced. The electrode compositions consisted of 90 parts by weight active material, 5 parts by weight Super P carbon and 5 parts by weight polyvinylidene fluoride as binder. The electrode active material loading was around 5 mg/cm².

The active material was mixed with the binder in N-methylpyrrolidone, applied to a primer pre-treated aluminium foil by means of a coating doctor blade technique and the N-methylpyrrolidone evaporated at 105° C. under vacuum. The primer of the aluminium foil consisted of a thin carbon coating which improves the adhesion of the active material particularly when the active material content of the electrode is above 85 wt %. The electrodes were cut out (13 mm²) and pressed using a pressure of 3 tons for one minute. The electrodes were dried overnight at 120° C. under vacuum, and assembled in an argon filled glove box and electrochemically measured against lithium metal. The electrochemical measurements were performed using LP30 (Merck, Darmstadt) as electrolyte (ethylene carbonate:dimethyl carbonate is 1:1; 1M $LiPF_6$). The test procedure was carried out in a constant current, constant voltage mode; i.e. cycles with the C/10 discharge rate for the first cycles and C discharge rates increasing from 1 C to 20 C for the subsequent cycles. After each charge step at constant current, the electrochemical cell was further charged at constant voltage until the current falls under C/50.

FIG. 1 shows the electrochemical performance of the electrode using $LiMn_{0.66}Fe_{0.34}PO_4$ according to Example 1 as cathode active material. The prepared electrode has a specific capacity of 135 mAh/g at a charge rate of 0.1 C at ambient temperature. Thereby the electrochemical performance of the electrode prepared with the carbon-coated lithium transition metal phosphate according to the present invention is comparable with material of the state of the art.

The present invention provides a method of manufacturing carbon-coated lithium transition metal phosphates for lithium-ion batteries which is highly economical by using low cost source materials and with no waste water. The electrode prepared with the carbon-coated lithium transition metal phosphate according to the present invention shows at least similar if not better electrochemical properties than materials of the state of the art synthesized by solid state routes and wet chemistry routes.

The invention claimed is:

1. A process of preparing carbon-coated lithium transition metal phosphate, wherein the lithium transition metal phosphate has a formula represented by

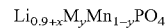

wherein

M is at least one element of the group of Fe, Co, Ni, Mg, Zn, Ti, Ca, Sr, Ba, Al, Zr $0 \leq x \leq 0.2$ $0 \leq y \leq 1.0$ said process comprising steps, wherein the steps comprise:
  a) dispersing or dissolving at least one starting material compound selected from the group consisting of at least one lithium source, at least one M source, if present, at least one manganese source, if present, and at least one phosphorous source, in an essentially aqueous medium to obtain a starting material dispersion or solution and heating the starting material dispersion or solution to a temperature between 50° C. and 100° C.;
  b) adding one or more remaining starting material compounds selected from the group consisting of at least one lithium source, at least one M source, if present, at least one manganese source, if present, and at least one phosphorus source, said remaining starting material compounds not being present in the starting material dispersion or solution obtained in step a), to the starting material dispersion or solution obtained in step a) to provide a precursor mixture;
  c) subjecting the precursor mixture obtained in step b) to at least one wet milling step in the presence of at least one electrically conducting material or at least one precursor of an electrically conducting material to obtain a wet milled suspension;
  d) drying the wet milled suspension obtained in step c) to obtain a solid compound; and
  e) heat treating the solid compound obtained in step d).

2. The process according to claim 1, wherein the heating of the starting material dispersion or solution performed in step a) is to a temperature between 80° C. and 100° C.

3. The process according to claim 2, wherein during step b), the temperature is maintained at between 80° C. and 100° C.

4. The process according to claim 2, wherein the remaining starting material compounds are dispersed or dissolved in an essentially aqueous medium prior to being added to the starting material dispersion or solution.

5. The process according to claim 1, wherein the remaining starting material compounds are dispersed or dissolved in an essentially aqueous medium prior to being added to the starting material dispersion or solution.

6. The process according to claim 5, wherein the essentially aqueous medium containing the remaining staring material compounds is heated to a temperature of from between 50° C. to 100° C.

7. The process according to claim 1, wherein during step b), the temperature is maintained at between 50° C. and 100° C.

8. The process according to claim 1, wherein all the remaining starting material compounds are added concurrently to the starting material dispersion or solution.

9. The process according to claim 1, wherein there is sequential addition of at least two remaining starting material compounds to the starting material dispersion or solution.

10. The process according to claim 1, wherein the addition in step b) is carried out over a time period of 1 to 3 hours.

11. The process according to claim 1, for the preparation of carbon-coated $Li_{0.9+x}FePO_4$.

12. The process according to claim 1, for the preparation of carbon-coated $Li_{0.9+x}MnPO_4$.

13. The process according to claim 1, for the preparation of carbon-coated $Li_{0.9+x}Fe_{0.5}Mn_{0.5}PO_4$.

14. The process according to claim 1 for the preparation of carbon-coated $Li_{0.9+x}Fe_{0.34}Mn_{0.66}PO_4$.

15. The process according to claim 1, wherein the remaining starting material compounds are dispersed or dissolved in an essentially aqueous medium prior to being added to the starting material dispersion or solution.

* * * * *